Jan. 30, 1962 S. E. KARY 3,019,326
APPARATUS FOR ASSEMBLING WIRE GRATINGS
Filed Aug. 13, 1959 5 Sheets-Sheet 1
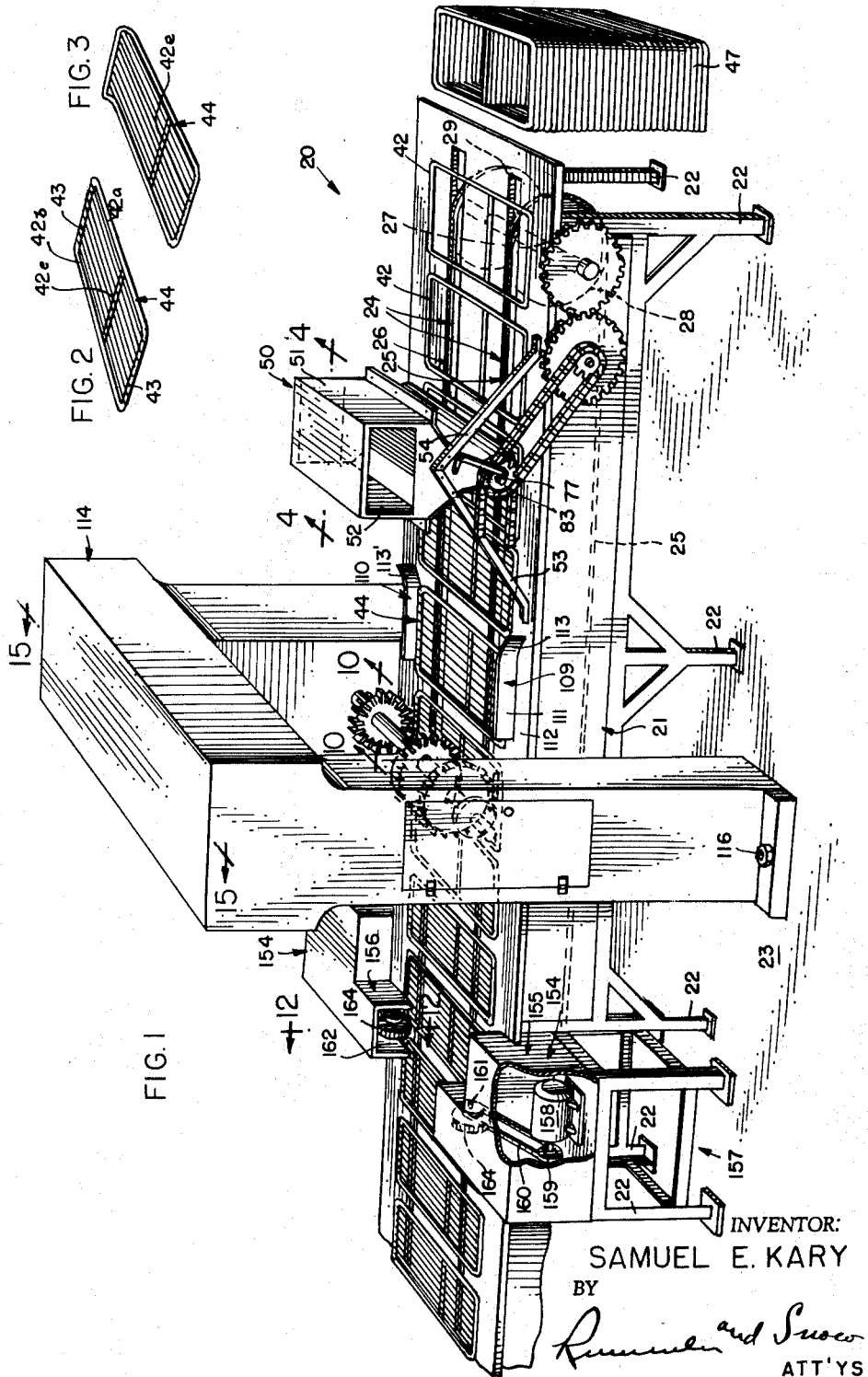
INVENTOR:
SAMUEL E. KARY
BY
ATT'YS Jan. 30, 1962 S. E. KARY 3,019,326
APPARATUS FOR ASSEMBLING WIRE GRATINGS
Filed Aug. 13, 1959 5 Sheets-Sheet 2
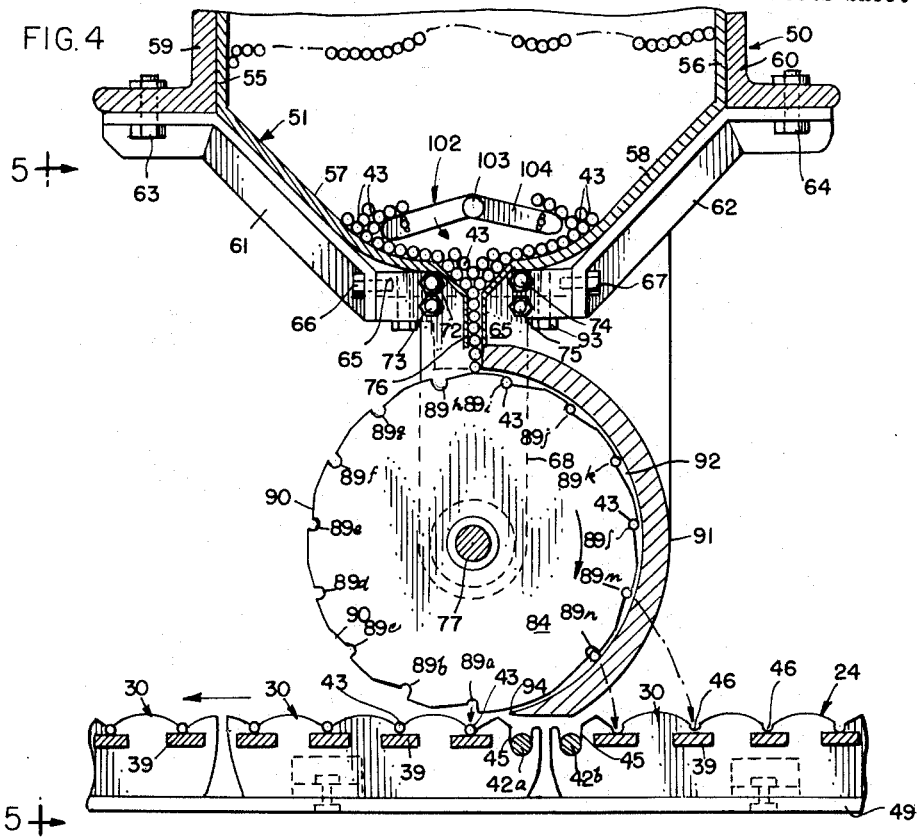
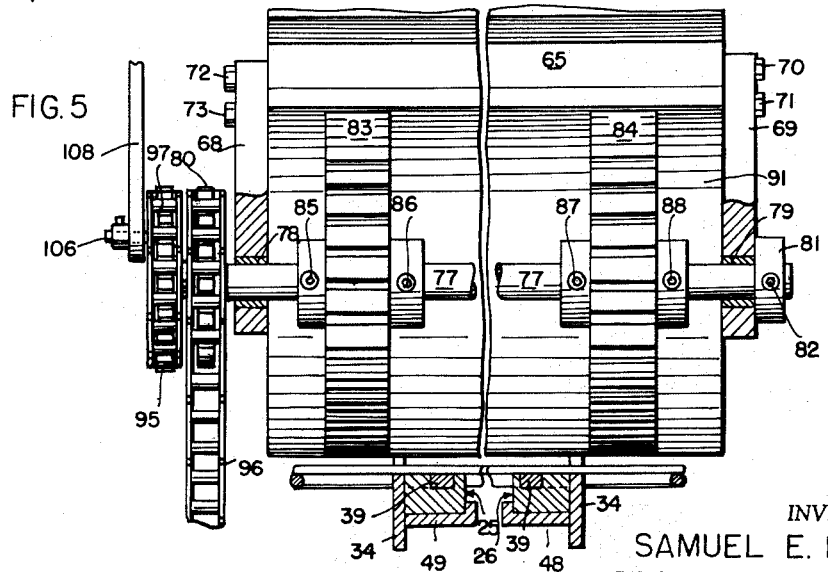
INVENTOR:
SAMUEL E. KARY
BY
ATT'YS Jan. 30, 1962 S. E. KARY 3,019,326
APPARATUS FOR ASSEMBLING WIRE GRATINGS
Filed Aug. 13, 1959 5 Sheets-Sheet 3
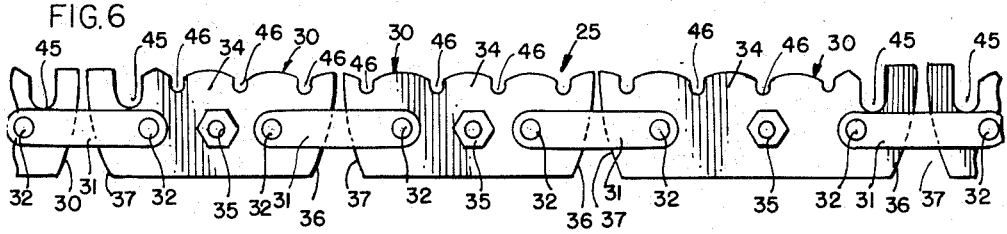
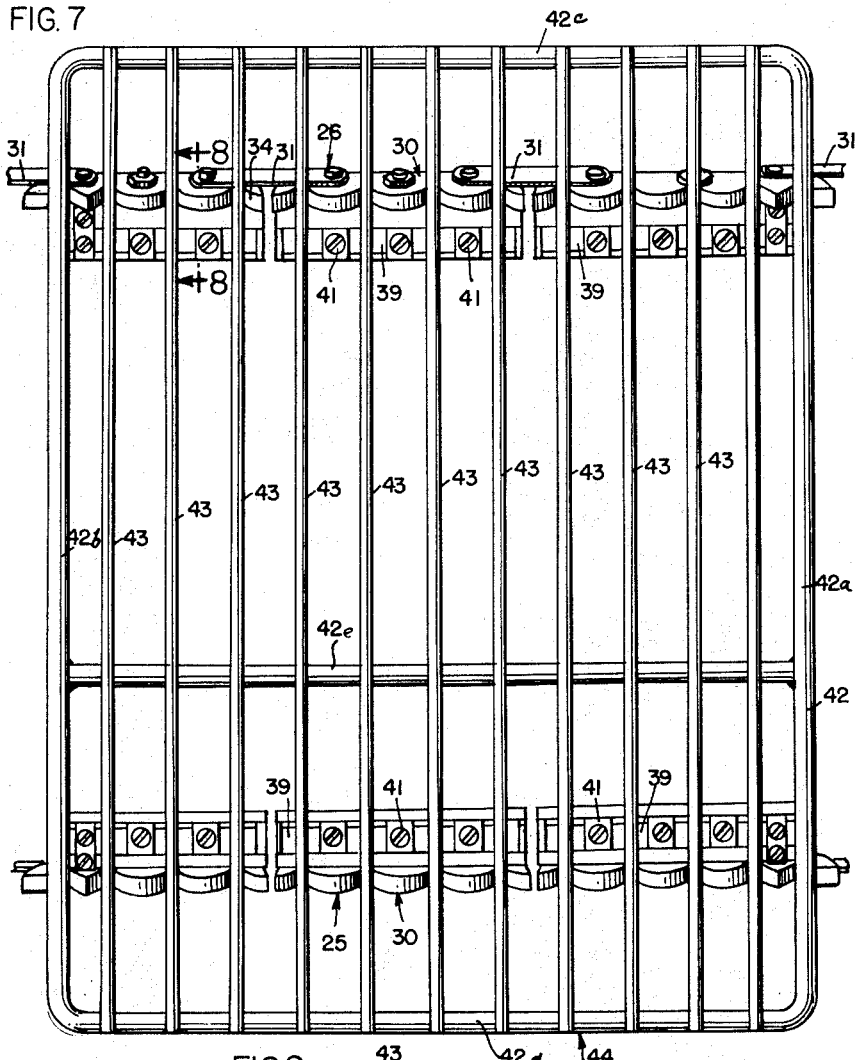
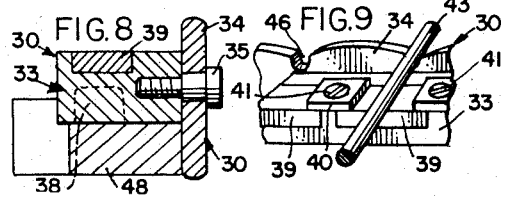
INVENTOR:
SAMUEL E. KARY
BY
ATT'YS Jan. 30, 1962        S. E. KARY        3,019,326
APPARATUS FOR ASSEMBLING WIRE GRATINGS
Filed Aug. 13, 1959        5 Sheets-Sheet 4
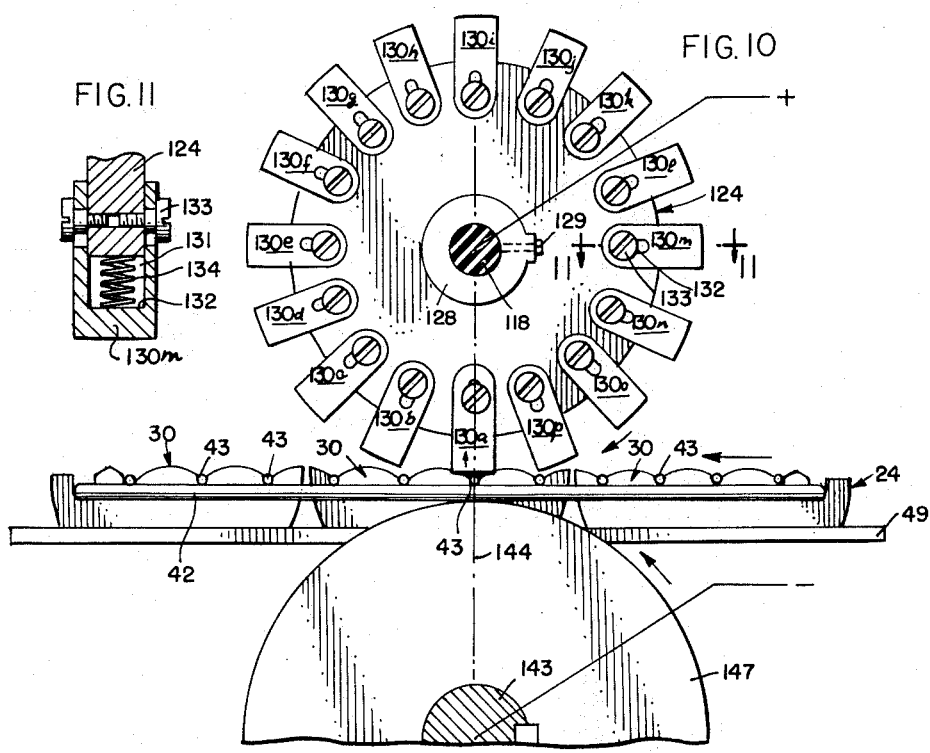
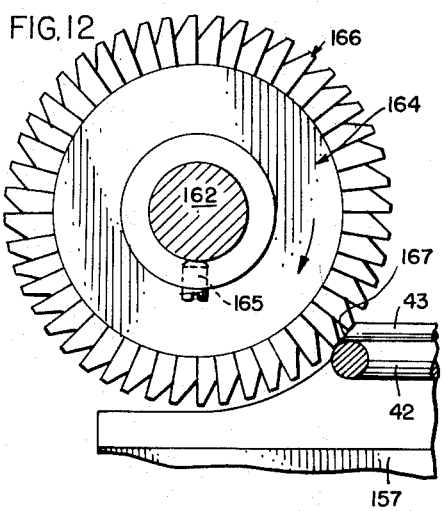
INVENTOR:
SAMUEL E. KARY
BY
ATT'YS Jan. 30, 1962 S. E. KARY 3,019,326
APPARATUS FOR ASSEMBLING WIRE GRATINGS
Filed Aug. 13, 1959

INVENTOR:
SAMUEL E. KARY
ATT'YS

United States Patent Office 3,019,326
Patented Jan. 30, 1962

3,019,326
APPARATUS FOR ASSEMBLING WIRE
GRATINGS
Samuel E. Kary, 2405 S. 57th Court, Cicero 50, Ill.
Filed Aug. 13, 1959, Ser. No. 833,637
11 Claims. (Cl. 219—56)

This invention relates to an apparatus for assembling wire gratings. More in particular this invention relates to an automatic multi-stage assembling apparatus for the manufacture of wire gratings of the type having a plurality of wire rods in transverse spaced relation welded to a wire frame.

In the manufacture of wire gratings of the type used for shelving in cook ovens, refrigerators, freezers, etc., or in components for caging and the like, it is customary to first form a wire frame. Wire rods cut to proper length are then placed on the frame in predetermined spaced relation and the rods thereafter welded to the frame to form the grating. As a final operation the ends of the wire rods are chamfered to remove sharp projections sometimes occurring when the rods are cut to length and also excess metal sprouts arising during welding.

In the usual assembling of such gratings it is customary to employ assembling labor to perform (1) the positioning of the wire frame in a fixture and manually deposit wire rods in proper position and then clamping the rods in contiguous relation to the frame. The fixtures with the pre-assembly are then (2) transported to the welding area. In the next operation (3) the rods are welded to the frame by manual operated welding equipment. Thereafter (4) the welded gratings are again transported to another area where the fixtures are removed therefrom. The fixtures then being (5) transported back to the pre-assembly operation and (6) the welded gratings tranported to a third area where the burrs, sprouts and excess metal are (7) removed by chamfering. Since labor costs, time and manufacturing space comprise a major factor in the net production cost of gratings, it is extremely advantageous that such costs be eliminated or minimized wherever possible.

With the foregoing in mind it is a prime object of this invention to provide an apparatus for assembling wire gratings at greatly reduced time and cost.

A further object of this invention is to provide apparatus for assembling wire gratings automatically in multistage continuous operations.

A still further object of this invention is to provide apparatus for assembling wire gratings automatically employing a greatly reduced floor space.

A yet further object of this invention is to provide apparatus for automatically assembling wire gratings employing greatly reduced manual labor.

Another object of this invention is to provide apparatus for automatically assembling wire gratings employing greatly reduced transporting equipment.

Still another object of this invention is to provide apparatus for automatically assembling wire gratings in finished form at greatly reduced manufacturing cost.

These and other desirable and important objects inherent in and encompassed by the invention will be more readily understood from the ensuing description of a preferred embodiment, the appended claims and the annexed drawings wherein:

FIGURE 1 is a perspective view illustrating the general arrangement of the components in the apparatus of this invention.

FIG. 2 illustrates a planular wire grating assembled in accordance with this invention.

FIG. 3 illustrates a wire grating similar to that of FIG. 2 except that one end portion projects in an upward direction.

FIG. 4 is a side elevation, in section and partly broken away, illustrating the construction details of the wire rod dispenser and its relation to a conveyor.

FIG. 5 is an endwise elevation, partly in section and partly broken away, taken on line 5—5 of FIG. 4, illustrating the details of the lower portion of the wire rod dispenser.

FIG. 6 is a side elevation of one of the conveyor chains illustrating the arrangement of the link members comprising each of the chains and also the means for positioning the wire rods and wire frame.

FIG. 7 is a plan view of the conveyor having one wire frame and its associated wire rods positioned to form a wire grating.

FIG. 8 is a sectional view, taken on line 8—8 of FIG. 7, showing the construction of a link member in the conveyor chains.

FIG. 9 is a perspective view, partly broken away, of a conveyor chain link member as viewed from the inward side or opposite that of FIG. 6.

FIG. 10 is an enlarged side elevation, partly in section and partly broken away, taken on line 10—10 of FIG. 1 illustrating the welding mechanism and its relation to the conveyor.

FIG. 11 is a sectional view, partly broken away, taken on line 11—11 of FIG. 10 illustrating the resilient means for engaging electrodes with the wire rods.

FIG. 12 is an endwise view, partly in section and partly broken away, taken on line 12—12 of FIG. 1 showing the front cutting element of the chamfering device positioned for chamfering one end portion of a wire rod of a welded grating.

FIG. 13 is a perspective view of a portion of a welded grating with the wire rods thereof chamfered.

Figure 14:
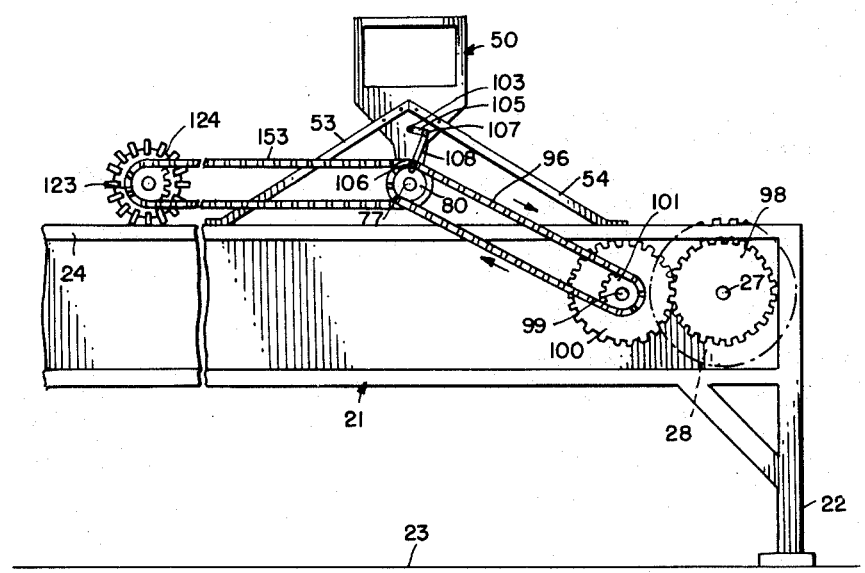
FIG. 14 is an elongated fragmentary side elevation of FIG. 1 showing the power transmission means between the conveyor drive and the dispenser and also the power transmission means for driving the welder electrode wheels.

With continued reference to the drawings it will be seen from FIG. 1 the numeral 20 generally indicates the general arrangement of the components comprising the automatic multi-stage operation wire grating assembling apparatus of this invention. The apparatus 20 includes a table or stationary base structure generally indicated at 21 having a plurality of supporting legs 22 resting on the floor 23. The legs 22 may be anchored to the floor 23 by any suitable means such as bolts (not shown).

Mounted on the base structure is an endless conveyor indicated at 24 the upper portion of which moves in a leftward direction as viewed in FIG. 1 and the lower portion thereof returning on the underside of the base structure 21 as indicated by the arrows. The conveyor 24 is comprised of two transversely spaced endless chains movable longitudinally in complementary relation, the endless front chain indicated at 25 and the endless rear chain 26. The upper portion of the conveyor 24 operates to conduct longitudinally the component parts of the wire grating through the various stages of assembling operations. At the righthand end or feeder end of the apparatus 20 on the base structure 21 there is mounted transversely a drive shaft 27 journalled thereto for rotation. A source of power (not shown) is connected to the drive shaft in driving relation. A suitable source of power for such purpose is of conventional construction and conveniently may comprise an energized electric motor drivingly connected to a conventional speed reduction unit the output shaft thereof being in turn drivingly connected to the drive shaft 27.

Mounted on the drive shaft 27 and constrained for rotation therewith is a first or front sprocket wheel 28 and a second or rear sprocket wheel 29. The sprocket wheels 28 and 29 are positioned in transverse spaced relation in alignment to cooperate respectively the front chain 25 and rear chain 26 of the conveyor 24 as will be evident from FIG. 1. The left-hand end of the base structure 21 is provided with a rotatable shaft having a pair of corresponding idler sprockets similar to the sprocket wheels 28 and 29 to facilitate movement of the conveyor 24 in a conventionally known manner. Thus it can be seen that the rotation of the drive shaft 27 moves the endless chains 25 and 26 of the conveyor 24 on the base structure 21 as is evident from FIG. 1.

It has been stated above that the chains 25 and 26 are complementary to each other. Except that the chain 26 is of symmetrical construction to that of the chain 25, the elements comprising each of the chains are otherwise identical. For this reason it is deemed expedient to describe the details of construction of the chain 25, it being understood that the construction of chain 26 is symmetrical and complementary thereto.

Referring now to FIGS. 6 through 9 it will be seen that the chain 25 is comprised of a plurality of individual link members indicated at 30 pivotally connected together in end-to-end relation by link elements 31. The link elements 31 are pivotally connected to the link members at 32 as best illustrated in FIG. 6 thus forming an endless chain relation. Referring now to FIGS. 8 and 9 each of the link members 30 is comprised of a body element 33 of generally rectangular shape. On the outer side of the body element 33 is a plate 34 projecting upwardly above and downwardly below the body element 33 as shown best in FIG. 8. The plate 34 is rigidly connected to the body element 33 by any convenient means such as bolts 35 (FIGS. 6 and 8) threadedly fit into suitable bores in the body elements 33. As will be noted from FIG. 6 the ends of each of the plates 34 are curved at 36 and 37 to facilitate movement of the link members 30 on the periphery of the sprocket wheel 28 without interference from adjacent link members.

The body element 33 preferably should be made of low density metal such as aluminum or an alloy thereof to minimize the weight of the chain 25 thereby reducing power requirements to motivate the conveyor 24.

On the lower portion of the body elements 33 in uniform longitudinal spaced relation are disposed cavities, one of which is shown in dotted lines at 38 in FIG. 8. These cavities 38 open at the underside of the body elements 33 and have a contour adapted to fit in engaging relation with the teeth of the sprocket wheel 28 in driven relation. The cavities 38 are spaced longitudinally apart so that they mesh with the teeth of the sprocket 28. Thus any rotation of the sprocket wheel 28 positively drive the chain 25.

Embedded on the upper portion of each body element 33 is a permanent magnet 39 secured thereto by conventional means and as an overlapping washer 40 held by a screw 41 threadedly fit into the body element 33. The magnets 39 disposed on each of the body elements 33 throughout the chain 25, are for the purpose of partly securing, in magnetically engaging relation, the wire frames, one of which is shown at 42 in FIG. 7, and transversely spaced wire rods 43 to the conveyor 24 during the various operational stages in assembling gratings of the type indicated generally at 44 of FIG. 2 and 44' of FIG. 3 to be discussed later in more detail.

At this point it becomes necessary to describe the component parts for constructing the grating 44 shown in FIG. 2. The grating 44 is comprised of a generally rectangular shaped wire frame 42 (FIG. 7) having a plurality of wire rods 43 disposed in predetermined parallel spaced relation. The wire frame 42 may also include one or more additional crosswise reinforcing elements such as the bar 42e shown in FIGS. 2, 3 and 7. The bar 42e is welded to the sides 42a and 42b in the same plane and is therefore an integral part of the wire frame 42. The length of each wire rod 43 is cut so that the ends thereof abut the frame 42 contiguously. The ends of each of the rods 43 are secured to the wire frame by welding thereto forming the grating 44 as an integral unit. In the present embodiment the wire frame 42 and the wire rods 43 must be made of material subject to the influence of magnetism such as for example iron or steel. Other commonly known magnetically susceptible materials may also be employed if desired. Having first selected the dimensional characteristics of the grating 44 including the wire frame 42 and wire rods 43 with desired spacing therebetween, it is obvious that the conveyor 24 must be adapted to accommodate these factors. Having these factors in mind the further construction details of the front chain 25 of the conveyor 24 will now be described.

Referring now to FIGS. 1, 6 and 7 the plates 34 of the chain 25 are provided with recesses 45 (FIG. 6) spaced longitudinally apart to fit slidably the sides 42a and 42b of the wire frame 42 (FIG. 7). The wire frame 42 thus fits into the recesses 45 engagingly so that the conveyor 24 moves it along in the apparatus 20. However, for purposes to be discussed later, the recesses 45 in the chain 25 for carrying the next or adjacent frame 44 (FIG. 1) on the conveyor 24 must be spaced so that the distance between the last wire rod 43 of one grating and the first wire rod 43 of the next adjacent grating is always constant for all gratings on the conveyor 24, said distance always being an integral multiple of the space between any two adjacent rods 43.

Referring now to FIGS. 6 and 9 it will be seen that the plates 34 are provided with a plurality of longitudinally disposed lateral slots 46. The longitudinal spacing of the slots 46 conform to the desired spacing between one wire rod 43 of the gating 44 and its next adjacent rod 43. The depth of the slots 46 are sufficient to permit the ends of the wire rods 43 inserted therein to rest upon in abutting or contiguous relation with the longitudinal portions 43c, 42d and the bar 42e of the wire frame 42 as best illustrated in FIG. 7. Now referring to FIG. 9 it will be seen that when each wire rod 43 is inserted in slot 46 the rod 43 is in close proximity to a magnet 39. The magnetic influence on the rod 43 by the magnet 39 draws the rod 43 downwardly so that the end thereof abuts the top surface of the side 42c of the wire frame 42 with continuous force. Thus the magnet 39 not only serves the rod 43 in the slot 46 but also serves to apply yieldable force to the rod 43 against the top surface of the side 42c of the wire frame 42 which force is desirable during the subsequent welding operation.

From the foregoing it is apparent that the conveyor 24 is adapted to receive engagingly a plurality of wire frames 42 in predetermined longitudinal spaced relation; that the conveyor 24 is also adapted to receive engagingly a plurality of wire rods 43 positioned in predetermined longitudinal spaced relation over each of the wire frames 42; and that the ends of each wire rod 43 abut the top surface of the sides 42c and 42d and the intermediate bar 42e of the wire frames 42 under yieldable force by means of the magnets 39 whereby the sub-assemblies of the gratings 44 are secured to and conducted by the conveyor 24 during motivation thereof.

At the extreme leftward or terminal end of the conveyor, as viewed in FIG. 1, conventional means such as idler sprocket wheels (not shown) are mounted on the stationary base structure 21 in cooperative relation with the chains 25 and 26 for a return means for the conveyor 24. Such idler sprocket wheels may conveniently be mounted on the structure 21 similarly as that for the sprocket wheels 28 and 29 except that no external means need be provided for driving them.

Now in order to maintain the upper or working portion of the conveyor in one plane, preferably horizontal, it is necessary to provide support means as otherwise the conveyor 24 would assume a catenary curve. To prevent such curvature or sagging of the conveyor 24, the stationary base structure 21 includes a longitudinally disposed flanged first track member 48 and a longitudinally disposed flanged second track member 49 in transverse spaced relation as shown in FIGS. 4, 5, 8 and 10. The track members 48 and 49 engage the surface joined by the underside of the body elements 33 of the link members 30 in slidable relation thus supporting the upper side of the conveyor 24. The depending portion of the plates 34 in the link members 30 and the flanges of the track members 48 and 49 serve to guide the chains 25 and 26 in lateral alinement while the track members support the chains in one plane.

At the lead or feeder end of the conveyor 24 a stack 47 of wire frames 42 are disposed. As shown in FIG. 1 an operator manually places the wire frames 42 in the recesses 45 of the conveyor as indicated by the curved arrows (FIG. 1) as the top of the conveyor 24 moves leftwardly toward the conveyor's terminal end at the left end of the apparatus 20. Of course, conventional power devices such as a second conveyor may be used to deposit the wire frames 42 on the progressively moving conveyor 24 in synchronized relation. As the frames 42 move with the conveyor 24 a first stage assembly operation is reached, namely, the automatic depositing of rods 43 in slots 46, the construction and operation of a means for automatically depositing cut-to-length rods 43 into the slots 46 progressively in synchronized relation with the conveyor will now be described.

Referring now to FIG. 1, it will be seen that as a first stage operation there is disposed a wire rod dispenser device generally indicated at 50. The dispenser 50 includes a container or hopper indicated at 51 having a sufficient transverse width to support therein a plurality of wire rods 43 in a transverse direction. The hopper is manually charged with the rods 43 through an opening 52 on the front side thereof. Of course, if desired the top of the hopper 51 may be eliminated and the hopper 51 may then be loaded from the top in which case the opening 52 is unnecessary. The hopper 51 is supported by the sides of the stationary base structure 21 by means of angularly disposed beams, two of which are shown at 53 and 54, suitably connected thereto as by bolts or welding.

Referring now to FIG. 4, it will be seen that the hopper 51 is of box-like construction having vertical sides 55 and 56 with the lower portion angular as at 57 and 58 sloping transversely toward the center thereof. Thus by gravity the wire rods 43 therein tend to move toward the bottom coinciding with a transverse vertical plane at the center. Reinforcement of the transverse sides of the hopper 51 may comprise cross-beams 59 and 60 secured to angle-beams 61 and 62 as by bolts, two of which are shown at 63 and 64 which in turn are connected to a transverse beam 65 as by bolts, two of which are shown at 66 and 67.

Referring now to FIG. 5, connected to each of the two transverse ends of the hopper 51 are disposed a pair of depending brackets 68 and 69 secured to the ends of the transverse beams 65 by bolts, six of which are shown at 70 to 75.

The transverse beam 65 is provided with an aperture 76. The aperture 76 extends downward from within the hopper 51 and opening at the bottom of the transverse beam 65. The transverse length of the aperture 76 is slightly longer than the wire rods 43 and of sufficient width to permit the emission or discharge by gravity of one rod 43 at one time through the bottom opening thereof as best illustrated in FIG. 4.

Disposed in spaced relation to the conveyor 24 is a rotatable spindle 77 (FIGS. 4 and 5) journalled to and supported by the lower portion of the brackets 68 and 69. Conveniently the journalling of one end portion of the spindle 77 to the bracket 68 may be in the form of a bearing sleeve 78 conventionally secured in the bracket 68 in pressed fit relation. Likewise the other end portion of the spindle 77 may also be rotatably supported by a bearing sleeve 79 positioned in the bracket 69 such as by a pressed fit relation. Thus the spindle 77 is journalled for rotation and supported by the brackets 68 and 69. Transverse movement of the spindle 77 is prevented by the nut portion of a sprocket wheel 80 secured thereto at one end in drive relation and by a collar 81 secured to the other end such as by a set screw 82.

Secured in drive relation to the spindle 77 is a pair of discs 83 and 84. The front disc 83 may be drivingly secured at the hub thereof by set screws 85 and 86 and likewise the rear disc 84 may be drivingly secured to the spindle 77 by set screws 87 and 88 in the hub thereof. The disc 84 is constructed exactly the same as the disc 83 and both are in complementary relation to each other. Therefore, only the construction of disc 84 will be described, it being understood that the disc 83 is identical thereto and complementary thereto.

Referring to FIG. 4 it will be seen that the periphery of the disc 84 is provided with a series of fourteen transverse grooves $89a$ to $89n$ inclusive. It will become obvious more or less than fourteen grooves may be employed depending on the number of wire rods to be assembled in each grating 44 or 44' being assembled. Each of the grooves $89a$ to $89n$ are of such dimension as necessary to receive the end portion of wire rods 43 as best illustrated in FIG. 4. It will be noted, however, that the peripheral distance between each of the grooves $89a$ to $89n$ adjacently are equal except the distance between the groove $89a$ and $89n$, said distance being much greater for a purpose later to be discussed. In the embodiment shown the disc 84 is adapted for assembling one wire frame 42 with fourteen wire rods 43.

Between each groove and its adjacent groove $89a$ to $89n$ is a radially sloping portion 90 akin to a saw-tooth formation. The spindle 77 carrying the disc 84 is positioned midway between the top of the conveyor 24 and the bottom of the aperture 76 and the radius of the disc 84 is sufficient to position the grooves $89a$ to $89n$ so that as the disc 84 is rotated clockwise, as viewed in FIG. 4, each groove receives in successive relation one wire rod 43 as individually emitted or discharged from the aperture 76. Now in order to retain the wire rods 43 in the grooves a transverse shoe 91 is provided. The shoe 91 is in the form of a sector of a cylinder having an inner surface 92 of a radius slightly greater than the outermost diameter of the disc 84. The surface 92 is radial with respect to the spindle 77 and the bottom of the shoe 91 terminates adjacent to the top of the conveyor 24 as best shown in FIG. 4. The shoe 91 may conveniently be secured rigidly to the under side of the transverse beam 65 such as by bolts, one of which is shown at 93.

From the above it can be appreciated that when the discs 83 and 84 are rotated in a clockwise direction as viewed in FIG. 4, each of the grooves $89a$ to $89n$ in successive relation as they move directly beneath the aperture 76 accepts one wire rod 43 and retains the wire rod therein until the groove with the rod 43 moves beyond the bottom 94 of the shoe 91 at which point the wire rod 43 drops downwardly by gravity from the discs 83 and 84 into slots 46 on the conveyor 24.

As viewed in FIG. 4 the conveyor 24 moves in a leftward direction. Rotation of the discs 83 and 84 are synchronized with the movement of the conveyor 24 so that a groove in the discs 83 and 84 always comes into registry with each slot 46 adjacent to the bottom 94 of the shoe 91. Thus it can be seen that the rods from the hopper 51 are systematically deposited, one at a time, in the slots 46 of the conveyor 24 as the conveyor 24 progresses in a lefthand direction.

As discussed previously there is an intervening longitudinal distance between one wire frame 42 and its next adjacent frame on the conveyor 24 as is evident from FIG. 1. During this intervening distance it is desirable that the dispenser 50 refrain from depositing wire rods 43 to the conveyor. For this reason the circumferential spring between groove 89a and 89n of the disc 84 (FIG. 4) is considerably greater than that between other adjacent grooves. Rotation of the disc 84 is timed so that groove 87n deposits the first rod 43 in a slot 46 of the conveyor 24 corresponding to the position of the first rod 43 on a wire frame 42. Progressively the groove 89m deposits the second wire rod 43 in a slot 46 of the conveyor 24 corresponding to the position of the second wire rod on the same wire frame 42. Progressively as the disc 84 rotates the groove 89a receives a rod 43 from the aperture 76 and deposits in a slot 46 of the conveyor 24 corresponding to the fourteenth and last rod 43 on the same frame 42. As viewed in FIG. 4 it will be seen that the first wire frame 42 has its rods 43 deposited thereon and the side 42a thereof is passing under the bottom 94 of the shoe 91 and the side 42b of the next frame 42 (having no wire rods 43 thereon) is approaching the dispenser 50. It will be seen that the enlarged distance between groove 89a and 89n on the disc 84 corresponds to the distance between the slot 46 on the conveyor 24 carrying the fourteenth or last rod 43 on the first frame 42 and the slot 46 of the conveyor 24 corresponding to the position of the second or next succeeding wire frame 42 as evidenced by the side 42b thereof in FIG. 4. Thus the dispenser 50 refrains from depositing wire rods 43 to the conveyor 24 between adjacent wire frames in recesses 46 therein.

As described above it is apparent that the disc 84 and its complementary disc 83 must be rotated with the spindle 77 in synchronized relation with the movement of the conveyor 24. A first power transmission means for achieving the aforementioned synchronized relation between the dispenser 50 and conveyor 24 will now be described.

Referring to FIGS. 5 and 14 it will be seen that one end of the spindle 77 is provided with two sprocket wheels 80 and 95 with associated sprocket chains 96 and 97 respectively in meshed relation as indicated. Both sprocket wheels 80 and 95 are secured to the spindle 77 in drive relation by any conventional means. Secured to the drive shaft 27 for the conveyor 24 (FIGS. 1 and 14) is a gear wheel 98. Mounted on the base structure 21 is a stub shaft 99 in non-rotatable relation. Journalled to the stub shaft 99 for rotation thereon is a pinion gear 100. Mounted onto the outer face of the pinion gear 100 is a sprocket wheel 101 in drive relation thereto. The sprocket chain 96 connects the sprocket wheel 101 with the sprocket wheel 80 in drive relation. From this it can be seen that when the drive shaft 27 is rotated, the spindle 77 with discs 83 and 84 is driven through the sprocket wheel 80, sprocket chain 96, sprocket wheel 101, pinion gear 100, and gear wheel 98. Thus a power transmission means for driving the discs 83 and 84 on spindle 77 of the dispenser 50 has been described and by conventional selection of the components of the transmission, synchronous relation between the discs 83 and 84 with the movement of the conveyor 24 can readily be achieved.

Referring back to FIG. 4 it sometimes occurs, particularly when the hopper 51 of the dispenser 50 contains a large quantity of wire rods 43 therein, they tend to jam so that the rods 43 are prevented from movement toward the aperture 76. Such an occurrence results in that the dispenser 50 fails to deposit the correct number of rods 43 on each frame 42 passing through the first stage operating position on the conveyor 24. This undesirable result may be conveniently avoided by including in the dispenser 50 an agitator, generally indicated at 102 in FIG. 4. The agitator 102 is comprised of a transversely extending pivot pin 103 journalled to the two ends of the hopper 51. Mounted on the pivot pin 103 is a transversely extending angle plate or shelf 104 within the hopper 51 in secured relation. One end of the pivot 103 extends through the front side of the hopper 51 as best seen in FIG. 14. Secured on the front end of the pivot pin 103 is a rock arm 105 positioned in substantially a horizontal direction. Extending outwardly on the sprocket wheel 95 (FIG. 5) in off-center position is a stub pin 106. Pivotally connected at the outer end 107 of the rock arm 105 and the stub pin 106 (FIG. 14) is a connecting member 108. From this construction it can be seen that as the sprocket wheel 80 is rotated, a rocking motion of the angle plate or shelf 104 within the hopper 51 is translated through the connecting member 108 and the rock arm 105 connected to the pivot pin 103. This rocking motion of the angle plate or shelf 104 within the hopper 51 jogs or agitates the upper layers of the rods 43 in the hopper 51 thus eliminating any tendency for the rods 43 therein to jam. Thus a means for ensuring a continuous movement of the rods 43 in the hopper 51 to the aperture 76 has been described.

As the conveyor 24 moves each wire frame 42 through the first stage operation described above, the rods 43 are deposited transversely on the frame 42 in proper longitudinal spaced relation. The frame 42 and rods 43 thereon now move on the conveyor 24 to a second stage operating station now to be described.

In order to make certain that each wire frame 42 with the rods 43 deposited thereon are in proper alinement for a subsequent welding operation, means are provided for shifting the wire frame 42 and rods 43 transversely with respect to the conveyor 24 to obtain proper alinement as a second stage operation. The means for shifting the sub-assembly with respect to the conveyor 24 may comprise a pair of guide elements 109 and 110 as viewed in FIG. 1. The guide element 109 may comprise an angle bracket 111 having its under side rigidly secured to the upper side 112 of the stationary base structure 21. On the rightward end of the angle bracket 111 the vertical extending portion 113 thereof is bent or curved outwardly as shown. The guide element 110 is constructed symmetrically in the same manner as that of guide element 109 and mounted on the upper side 112 of the structure 21 in parallel spaced relation with respect to guide element 109. By properly positioning the guide elements 109 and 110 with respect to the welding mechanism 114, later to be described, it can be seen that as each wire frame 42 and rods 43 thereon move between the guide elements 109 and 110, any of said rods 43 or wire frame 42 not in proper alinement with respect to the conveyor 24 engages one or the other of the guide elements 109, 110 while moving therebetween. Any of the rods 43 or frame 42 not in alinement first engages the curved portions 113 or 113′ and as the conveyor 24 progresses such rods 43 or frame 42 are moved transversely into alinement. Thus, upon completion of the second stage operation each wire frame 42 and rods 43 thereon are uniformly alined or properly positioned for the third stage operation now to be described.

Figure 15:
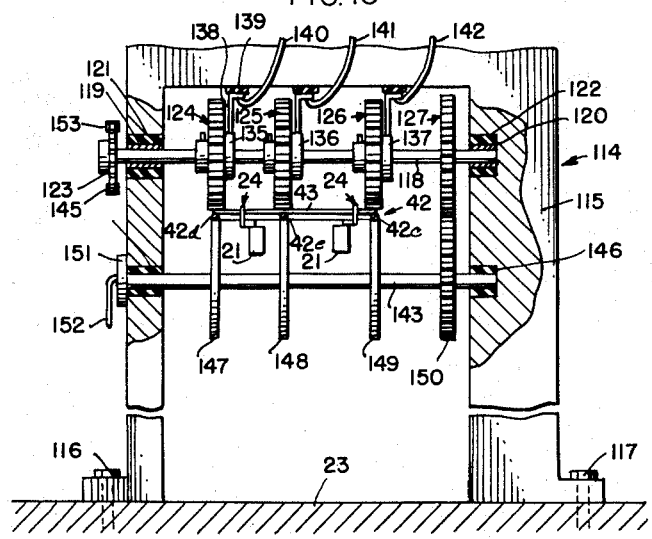
FIG. 15 is a fragmentary section taken on line 15—15 of FIG. 1 showing the construction of the electric welding mechanism in more detail.

The third stage operation in the apparatus of this invention consists of an electric welding mechanism generally indicated at 114 in FIGURES 1 and 15. Referring to FIGURE 15 the mechanism 114 comprises a V-shaped housing extending to the floor 23 and bolted thereto by bolts two of which are shown at 116 and 117. Alternately if desired the housing may be secured to the stationary base structure 21 if desired. In the housing 115 above the conveyor 24 is a second shaft 118 transversely disposed and journaled for rotation in bearing sleeves 119 and 120. The shaft 118 is preferably made of electrically non-conducting material such as hard rubber, Transite or the like. On the end portions of the shaft 118 metal sleeves 121 and 122 are secured thereto to engage, respectively, the bearing sleeves 119 and 120 for preventing excessive wear on the shaft 118. The front end of the shaft 118 projects through the casing 115 and is secured to a sprocket wheel 123.

Secured to the shaft 118 in spaced relation is a front electrode wheel 124 intermediate electrode wheel 125, rear electrode wheel 126 and a gear wheel 127 in spaced relation as indicated in FIGURE 15. The electrode wheel 124 is positioned in engaging alinement with side 42d (FIGURE 7) of the wire rod 42. Electrode wheel 125 is positioned in engaging alinement with the intermediate bar 42e of the wire frame 42 and electrode wheel 126 is positioned in engaging alinement with the side 42c of the wire frame 42. Each of the electrode wheels 124, 125 and 126 and therefore it is deemed necessary only to describe electrode wheel 124 it being understood that electrode wheels 125 and 126 are of the same construction and in complementary relation thereto.

Referring now to FIGURE 10 electrode wheel 124 is constructed of metal and secured at the hub 128 by a set screw 129 to the shaft 118. Disposed peripherally on the wheel 124 is a plurality of welding electrodes indicated at 130 but individually numbered 130a to 130p inclusive as shown in FIGURE 10. Each of the electrodes 130 is mounted in the wheel 124 resiliently movable inwardly in a radial direction. The construction of each resiliently movable electrode 130 is best illustrated in FIGURE 11. The wheel 124 is provided with a peripheral cavity 131 adapted to receive slidably in a radial direction the electrode 130m. The electrode 130m is provided with an elongated hole 132. The electrode 130m is retained in the cavity 131 by screw and bolt 133 secured to the wheel 124 and extending through the hole 132. This construction permits the electrode 130 to move slidably in a radial direction in the wheel 124 limited by the major dimension of the elongated hole 132. Now in order to urge resiliently the electrode 130m, a compression spring 134 is disposed in the cavity 131. Thus the electrode 130m is urged outwardly in a radial direction with respect to the wheel 124 but may be resiliently moved inwardly in a radial direction by applying a radial force of sufficient magnitude to compress the spring 134. Each electrode 130a to 130p is constructed in the same manner.

Referring now to FIGURE 10 it will be seen that at the outer extremities the circumferential distance between the center of one electrode 130 and the centers of its adjacent electrodes are equal to the distance between one wire rod 43 and an adjacent wire rod 43. Thus if the rotation of the wheel 124 in a clockwise direction, as viewed in FIGURE 10, is synchronized with movement of the conveyor 24, as each wire rod 43 coincides with the vertical plane 144 formed by the axis of shaft 118 an electrode 130 will engage abuttingly a wire rod 43. As seen in FIGURE 10 the electrode 130a is in engaging relation with a wire 43. The distance between the axis of the shaft 118 and the outer extreme surface of a disengaged electrode, e.g. 130b, is slightly greater than the distance between the axis of shaft 118 and the rod 43 in the referred to vertical plane 144. Thus when the electrode 130a engaged the rod 43 the electrode 130a was moved inwardly in a radial direction thereby permitting the spring 134 thereof to urge the electrode 130a into pressure engaging relation with the rod 43 as best illustrated in FIGURE 10. Now it can be appreciated by those skilled in the art of welding that if the wheel 124 is connected electrically to one side of a source of electric welding energy and the rod 43 and its abutting wire frame 42 is connected to the other side of the same source of electric welding energy, it is apparent that the rod 43 contacting the electrode 130a will fuse and weld to the wire frame 42. Means for connecting electrically the wheel 124 to one side of a source of electric welding energy and connecting the wire frame 42 and rods 43 with the other side of said source of energy will now be described.

Referring now to FIGURE 15 it will be seen that each of the electrode wheels 124, 125 and 126 is provided with a metal slip ring 135, 136 and 137, respectively. Each of the slip rings are electrically connected to the electrodes 130 by the face that the wheels 124, 125 and 126 are of metallic construction. Mounted on the upper portion of the housing 115 is an electric contactor 138 positioned in engaging relation with the slip ring 135 of wheel 124. The contactor 138 is insulated electrically from the housing 115 by interposing a block 139 of electric insulating material such as rubber, fiber, ceramic, glass or the like. An insulated wire cable or conductor 140 connects the contactor 138 to one side of the source of electric energy. In a similar manner wheels 125 and 126 are electrically connected to conductors 141 and 142 respectively.

It is advantageous to employ a separate source of electric energy to each of the electrode wheels 124, 125 and 126 as this provides more uniform welding current for each of the wheels but the ground side of all three sources may conveniently be connected together.

Now in order to complete the electric welding circuit it is advantageous not to rely on the stationary base structure 21 or conveyor 24 as an electrical ground connection to the other side of the source of electric energy. For this reason the housing 115 is provided with a third shaft 143 of metal construction disposed transversely in the same vertical plane 144 as that of shaft 118 best shown in FIGURE 10. The shaft 143 is journaled to the housing 115 employing conventional bearing sleeves 145 and 146 (FIGURE 15). Secured on the shaft 143 is a metal wheel 147 in alinement with the electrode wheel 124. The diameter of the wheel 124 is sufficiently large to reach in contact engaging relation with the underside of side 42d of the wire frame 42 carried by the conveyor 24. Metal wheels 148 and 149 are constructed and secured to the shaft 143 similar as that of metal wheel 147 except that metal wheel 148 is positioned to engage contactingly the intermediate bar 42e of the wire frame 42 and in alinement with electrode wheel 125 while metal wheel 149 is positioned to engage contactingly the side 42c of the wire frame 42 and in alinement with electrode wheel 126.

As viewed in FIGURE 15 the rearward end of the shaft 143 is secured to a gear wheel 150 in meshed relation with the gear wheel 127. The ratio of the gear 127 to gear 150 should be selected to minimize or prevent sliding action of the peripheral surfaces of the metal wheels 127, 148 and 149 on the wire frame 42 as such sliding action may adversely affect the welding efficiency through loss of current. On the front end of the shaft 143 is an electrical contact member 151 adapted to connect electrically the shaft 143 with the conductor 152. The conductor 152 is connected to the common or ground side of all three sources of electric welding energy associated with conductors 140, 141 and 142 previously described.

Now in order to synchronize the rotation of the shaft 118 and electrode wheels 124, 125 and 126 thereon as previously explained a second power transmission means is provided. Connecting the sprocket wheel 123 on the shaft 118 (FIGURES 14 and 15) with the sprocket wheel 80 on the spindle 77 of the dispenser 50 is a sprocket chain 153. The ratio of the sprocket wheels 80 and 123 is selected so that the rotation of the electrode wheels 124, 125 and 126 are synchronized with the movement of the conveyor 24 as previously explained.

From the foregoing it can be seen that as the conveyor 24 with wire 42 frame and associated wire rods 43 thereon progressively moves through the electric welding mechanism 114 each rod 43 is welded to the frame 42 simultaneously at three points, viz., at one end to the side 42d of the frame 42, at the intermediate bar 42e and at the other end to side 42c. Each rod 43 from the first to the fourteenth or last on the frame 42 is welded in progressive relation so that when the conveyor 24 has moved the frame 42 past the welding mechanism 114, all welding has been completed and an integral grating 44 has been formed. Of course it will be understood that the intermediate bar 42e of the wire frame 42 may be selectively positioned with reference to its parallel spacing between the ends 42c and 42d by relocating the electrode wheel 125 and metal wheel 148 on the shafts 118 and 143 appropriately.

Generally the ends of each of the rods 43 are rough or burned and sometimes jagged and sharp. For this reason it is necessary to chamfer the ends thereof to remove this objection. As a fourth stage operation of the apparatus of this invention, a means for chamfering the ends of the rods 43 on the grating 44 will now be described.

As seen in FIGURE 1 near the left or terminal end of the conveyor 24, at each side thereof, there is mounted a chamfering device generally indicated at 154 comprising a front cutting machine indicated at 155 and a complementary rear cutting machine indicated at 156. Since both cutting machines 155 and 156 are complementary to each other only the machine 155 will be described, it being understood that the machine 156 is identical but of opposite hand in construction.

The machine 155 comprises a support structure 157 having a plurality of legs resting on the floor 23 as seen in FIGURE 1. If desired the legs of the support structure 157 may be bolted to the floor 23 in a conventional manner. Mounted on the support structure 157 is a conventional power unit indicated at 158. The power unit may conveniently be comprised of an electric motor driving a pulley 159 connected by a suitable belt 160 to a second pulley 161 mounted on a rotatable shaft 162 which carries a cutter wheel 164 (see FIGURE 12). The shaft 162 is rotatably mounted with its axis in a longitudinal direction and extends transversely of the machine, parallel with the direction of travel of the conveyor 25. Conventional bearings (not shown) are mounted in the support structure 157 for journaling the shaft 162.

The rod-end-milling cutter, or cutter wheel, 164 is disposed in the chamfering device so as to overhand the adjacent end of the grating frame 42 and the cutting machine is arranged for adjustment both vertically and in and out relative to the conveyor center-line, by conventional means not shown, so that the periphery of the cutter will engage the ends of the rods 43 within the outermost edge of the frame 42 and trim them at an inwardly inclined angle as shown at 167 in FIGURE 12. The direction of rotation of the cutter 164 is, in any case, made so that the cutter teeth 166 will engage the rod ends in a direction toward the supporting frame 42 thus assuring that the trimming operation will not break the weld that has previously been made. The direction of rotation of the motor 158 will be determined accordingly. From this it can be appreciated that when the conveyor 24 moves the grating 44 through the chamfering device 154 the tip ends of each rod 43, progressively engage the cutting element 164 whereby the ends are chamfered to form the end surface 167 as shown in FIGURES 12 and 13. Thus the chamfering device 154 provides a means for automatically removing sharp edges, burrs, etc., from each end of the rods 43 of the grating 44 as the conveyor 24 progressively moves the grating therethrough.

After the fourth stage operation is completed the conveyor 24 moves the completed and assembled grating 44 to the terminal end of the conveyor 24 where it is dropped by gravity into a suitable receptacle (not shown). Alternatively another conveyor not shown may be provided for picking up the gratings 44 automatically at the discharge end of the conveyor 24 for carrying the gratings 44 to another operation such as plating or anodizing if desired.

Having now described an embodiment of the automatic progressive multi-stage assembling apparatus of this invention it can be seen that the objects of the invention have been fully achieved and it must be understood that changes and modifications may be made which do not depart from the spirit of the invention nor from the scope thereof as defined in the appended claims.

What is claimed is:

1. For use in the manufacture of wire gratings and the like having a plurality of wire rods welded to a preformed wire frame and in spaced relation thereon, an automatic multi-stage assembling apparatus comprising in combination a power driven movable conveyor, said conveyor having means positioned to receive said wire frame in engaging relation, a plurality of retaining means disposed on said conveyor positioned to receive and retain said rods in spaced relation abutting said wire frame and extending transversely across the frame, a wire rod dispenser disposed adjacent to said conveyor in first stage operating relation, said dispenser being adapted to deposit a wire rod in each of said retaining means, a guide means disposed adjacent to said conveyor along each side thereof in second stage operating relation, said guide means being adapted to shift said wire frame and said wire rods into uniform alinement with respect to said conveyor as said conveyor moves in said apparatus, a welding means disposed adjacent to said conveyor in third stage operating relation, said welding means being positioned operatively to weld said wire rods to said wire frame as said frame is transported by said conveyor, and means for synchronizing at least one of said stages in timed cyclic relation with the movement of said conveyor in said apparatus whereby said wire frame and said wire rods are assembled to form a unitary grating.

2. For use in the manufacture of wire gratings and the like having a plurality of wire rods welded to a wire frame in transverse spaced relation, an automatic multi-stage assembling apparatus comprising in combination a longitudinally movable conveyor for transporting said frame in a horizontal upwardly facing position, said conveyor having recesses positioned to receive said wire frame in engaging relation, a plurality of slots formed on said conveyor and positioned in longitudinal spaced relation between said recesses, a wire rod dispenser disposed adjacent to said conveyor in first stage operating relation, said dispenser being adapted to deposit a wire rod into each of said slots with the rod extending transversely of the conveyor and frame, a transverse shifting means disposed adjacent to said conveyor on each side thereof in second stage operating relation, said shifting means being adapted to shift said wire frame and said wire rods transversely with respect to said conveyor and into uniform alinement as said conveyor moves in said apparatus, a welding means disposed adjacent said conveyor in third stage operating relation, said welding means being positioned operatively to weld the end portions of said wire rods to the longitudinal portions of said wire frame, a rotary chamfering means disposed adjacent said conveyor on each side thereof in fourth stage operating relation, said chamfering means being operatively positioned to chamfer the ends of said welded wire rods adjacent to the longitudinal portions of said wire frame as said frame is held and transported by said conveyor, means for driving said conveyor, and means for synchronizing at least one of said stages in timed cyclic relation with the movement of said conveyor in said apparatus.

3. For use in the manufacture of a ferrous containing metal wire grating having a plurality of wire rods welded to a wire frame in transverse spaced relation, an automatic multi-stage assembling apparatus comprising in combination a stationary base structure, a longitudinally movable conveyor mounted on said structure and drive means therefor, a plurality of body elements disposed on said conveyor, each of said body elements having a magnet disposed on the outer portion thereof positioned to receive engagingly said wire frame in releasably secured relation, a wire rod dispenser disposed adjacent the feeder end of said conveyor in first stage operating relation, said dispenser having a hopper adapted to support a plurality of rods transversely to said conveyor, said hopper having a transverse aperture positioned in the lower portion thereof, said aperture being elongated to permit gravitational movement of one of said rods transversely therethrough at one time, a transversely rotatable spindle supported by said hopper, power means in said apparatus adapted to rotate said spindle in synchronized relation with movement of said conveyor, means on said spindle adapted to receive separately said rods from said aperture and depositing said rods in longitudinally spaced relation on said magnets of said body elements in contiguous relation to said frame, a guide element disposed on said apparatus in second stage operating relation, said guide element being positioned to move said rod and said frame into predetermined alinement with said conveyor, an electric welding mechanism disposed adjacent said conveyor in third stage operating relation, said mechanism consisting of a housing disposed adjacent said conveyor, a plurality of movable electrodes supported by said housing, said electrodes being positioned for engagement with portions of said rods contiguous with said wire frame, an electric contact means disposed in said apparatus positioned to engage the longitudinal end portions of said wire frame, a source of electric energy connected to said electrodes and said contact means, and a second power means in said apparatus adapted to move said electrodes in synchronized relation with movement of said conveyor whereby said electrodes move into registry with said rods contiguous to said frame for welding said rods to said frame in sequence relation to form said grating.

4. For use in the manufacture of a ferrous containing metal wire grating having a plurality of wire rods welded to a wire frame in transverse spaced relation, an automatic multi-stage assembling apparatus comprising in combination a stationary base structure, a longitudinally movable conveyor mounted on said structure and drive means therefor, a plurality of body elements disposed on said conveyor, each of said body elements having a magnet disposed on the outer portion thereof positioned to receive engagingly said wire frame in releasably secured relation, a wire rod dispenser disposed adjacent the feeder end of said conveyor in first stage operating relation, said dispenser having a hopper adapted to support a plurality of rods transversely to said conveyor, said hopper having a transverse aperture positioned in the lower portion thereof, said aperture being elongated to permit gravitational movement of one of said rods transversely therethrough at one time, a transversely rotatable spindle supported by said hopper, power transmission means in said apparatus connecting said spindle with said drive means for rotating said spindle in timed relation with movement of said conveyor, means on said spindle adapted to receive separately said rods from said aperture and depositing said rods in longitudinally spaced relation on said magnets of said body elements in contiguous relation to said wire frame, a guide element disposed in said apparatus in second stage operating relation, said guide element being positioned to move said rod and said frame into predetermined alinement with said conveyor, an electric welding mechanism disposed adjacent said conveyor in third stage operating relation, said mechanism consisting of a housing disposed adjacent said conveyor, a plurality of movable electrodes supported by said housing, said electrodes being positioned for engagement with portions of said rods contiguous with said wire frame, an electric contact means disposed in said apparatus positioned to engage the longitudinal portions of said wire frame, a source of electric energy connected to said electrodes and said contact member, and a second power transmission means drivingly connecting said electrodes with said spindle in timed relation whereby said electrodes move into registry with said rods contiguous to said frame for welding said rods to said frame in sequence relation to form said grating.

5. For use in the manufacture of a ferrous containing metal wire grating having a plurality of wire rods welded to a wire frame in transverse spaced relation, an automatic multi-stage assembling apparatus comprising in combination a stationary base structure, a longitudinally movable conveyor mounted on said structure and drive means therefor, track means mounted on said structure positioned to guide the movement of a portion of said conveyor, a plurality of body elements disposed on said conveyor, each of said body elements having a magnet disposed on the outer portion thereof positioned to receive engagingly said wire frame whereby said frame is carried by said conveyor in releasably secured relation, a wire rod dispenser disposed adjacent the feeder end of said conveyor in first stage operating relation, said dispenser having a hopper adapted to support a plurality of rods transversely to said conveyor, said hopper having a transverse aperture positioned in the lower portion thereof, said aperture being elongated to permit gravitational movement of one of said rods transversely therethrough at one time, a transversely disposed rotatable spindle supported by said hopper, an agitator disposed in said hopper, said agitator being drivingly connected to said spindle and adapted to move said rods into alinement with said aperture, power transmission means in said apparatus connecting said spindle with said drive means for rotating said spindle in timed relation with movement of said conveyor, means on said spindle adapted to receive separately said rods emerging from said aperture and subsequently depositing transversely in sequence each rod in longitudinal spaced relation on said magnets of said body elements in contiguous relation to said wire frame, a guide element disposed on said base structure adjacent each side of said conveyor in complementary relation in second stage operating relation, said guide elements being positioned to move said rod and said frame into predetermined alinement with said conveyor, an electric welding mechanism disposed adjacent said conveyor in third stage operating relation, said mechanism consisting of a housing disposed adjacent said conveyor, a plurality of movable electrodes supported by said housing, said eelctrodes being positioned for engagement with portions of said rods contiguous with said wire frame, an electric contact means disposed in said apparatus positioned to engage the longitudinal end portions of said wire frame, a source of electric energy connected to said electrodes and said contact means, and a second power transmission means drivingly connecting said electrodes with said spindle in timed relation whereby said electrodes move into registry with said rods contiguous to said frame for welding said rods to said frame in sequence relation to form said grating.

6. For use in the manufacture of a ferrous containing metal wire grating having a plurality of wire rods welded to a wire frame in transverse spaced relation, an automatic multi-stage assembling apparatus comprising in combination a stationary base structure, a longitudinally movable conveyor mounted operatively on said structure and drive means therefor, track means mounted on said base structure positioned to guide the movement of a portion of said conveyor, a plurality of body elements disposed on said conveyor, each of said body elements having a magnet disposed on the outer portion thereof positioned to receive engagingly said wire frame whereby said frame is carried by said conveyor in releasably secured relation, a wire rod dispenser disposed adjacent the feeder end of said conveyor in first stage operating relation, said dispenser having a hopper adapted to support a plurality of rods transversely to said conveyor, said hopper having a transverse aperture positioned in the lower portion thereof, said aperture being elongated to permit lateral gravitational movement of one of said rods therethrough at one time, a transversely rotatable spindle supported by said hopper, power transmission means in said apparatus connecting said spindle with said drive means for rotating said spindle in timed relation with movement of said conveyor, a pair of discs mounted on said spindle in transverse spaced relation and having a peripheral portion thereof adjacent to said aperture, said discs having a plurality of grooves disposed about the periphery thereof, each groove in one of said discs being positioned in complementary relation with a groove in the other of said discs to receive supportingly one of said rods emerging through said aperture during each revolution thereof, an agitator disposed in said hopper, said agitator being drivingly connected to said spindle and adapted to move said rods into alinement with said aperture, a shoe supported by said hopper positioned to retain said rods in said complementary grooves during a portion of each revolution of said discs, said discs being rotated in synchronized relation with movement of said conveyor for depositing said rods on said magnets of said body elements transversely in predetermined longitudinally spaced relation contiguous to said wire frame, a guide element disposed on said base structure adjacent each side of said conveyor in complementary relation in second stage operating relation, said guide elements being positioned to move said rods and said frame into predetermined alinement with said conveyor, an electric welding mechanism disposed adjacent said conveyor in third stage operating relation, said mechanism consisting of a housing disposed adjacent said conveyor, a plurality of movable electrodes supported by said housing, said electrodes being positioned for engagement with portions of said rods contiguous with said wire frame, an electric control means disposed in said apparatus positioned to engage the longitudinal end portions of said wire frame, a source of electric energy connected to said electrodes and said contact means, and a second power transmission means drivingly connecting said electrodes with said spindle in timed relation whereby said electrodes move into registry with said rods contiguous to said plane for welding said rods to said frame in sequence relation to form said grating.

7. For use in the manufacture of a ferrous containing metal wire grating and the like having a plurality of wire rods welded to a wire frame in transverse spaced relation, an automatic multi-stage assembling apparatus comprising in combination a stationary base structure, a longitudinally movable conveyor mounted operatively on said structure and drive means therefor, track means mounted on said base structure positioned to guide a portion of said conveyor, a plurality of body elements disposed on said conveyor, each of said body elements having a magnet disposed on the outer portion thereof positioned to receive engagingly said wire frame whereby said frame is carried by said conveyor in releasably secured relation, a wire rod dispenser disposed adjacent the feeder end of said conveyor in first stage operating relation, said dispenser having a hopper adapted to support a plurality of rods transversely to said conveyor, said hopper having a transverse aperture positioned in the lower portion thereof, said aperture being elongated to permit lateral gravitational movement of one of said rods therethrough at one time, a transversely disposed rotatable spindle supported by said hopper, power transmission means in said apparatus connecting said spindle with said drive means for rotating said spindle in timed relation with said conveyor, a pair of discs mounted on said spindle in transverse spaced relation and having a peripheral portion thereof adjacent to said aperture, said discs having a plurality of grooves disposed about the periphery thereof in complementary relation, each groove in one of said discs and the complementary groove in the other of said discs being positioned to receive supportingly one of said rods emerging through said aperture during each revolution thereof, an agitator disposed in said hopper, said agitator being drivenly connected to said spindle and adapted to move said rods in said hopper into alinement with said aperture, a shoe supported by said hopper positioned to retain said rods in complementary grooves during a portion of each revolution of said discs, said discs being rotated in synchronized relation with movement of said conveyor for depositing said rods on said magnets of said body elements on said conveyor transversely in predetermined longitudinally spaced relation contiguous to said wire frame, a guide element disposed on said base structure adjacent each side of said conveyor in complementary relation in second stage operating relation, said guide elements being positioned to move said wire rods and said wire frame laterally into predetermined alinement with said conveyor, an electric welding mechanism disposed adjacent said conveyor in third stage operating relation, said mechanism consisting of a housing disposed adjacent said conveyor, a shaft disposed transversely and journaled to said housing in electrically insulated relation, a front electrode wheel and a rear electrode wheel constrained for rotation with said shaft, each of said electrode wheels having a plurality of electrodes positioned about the periphery thereof, said electrode wheels being transversely spaced for engagement with the portions of said rods contiguous with said wire frame, an electric contact means disposed on said base structure positioned to engage the longitudinal end portions of said wire frame, a source of electric energy connected to said electrode wheels and said contact means, and a second power transmission means drivingly connecting said shaft with said spindle in timed relation whereby said electrodes move into registry with said wire rods contiguous to said frame carried by said conveyor for welding said rods to said frame in sequence relation to form said grating.

8. For use in the manufacture of a ferrous containing metal wire grating and the like having a plurality of wire rods welded to a wire frame in transverse spaced relation, an automatic multi-stage assembling apparatus comprising in combination a stationary base structure, a longitudinally movable conveyor mounted operatively on said structure, a drive means mounted on said structure connected in driving relation to said conveyor, track means mounted on said base structure positioned to support the upper portion of said conveyor, a plurality of body elements disposed in said conveyor, each of said body elements having a magnet disposed on the outer portion thereof, said body elements and magnets being positioned to receive engagingly said wire frame whereby said frame is carried by said conveyor in releasably secured relation, a wire rod dispenser disposed adjacent to the feeder end of said conveyor in first stage operating relation, said dispenser having a hopper adapted to support a plurality of rods transversely above said conveyor, said hopper having a transverse aperture positioned in the lower portion thereof with sufficient clearance to permit emission of one of said rods horizontally therethrough at one time, a pair of transversely spaced depending brackets connected to said hopper, a transversely disposed spindle supported by said brackets in journaled relation, power transmission means in said apparatus connecting said spindle with said drive means for rotating said spindle in timed relation with said conveyor, a pair of discs mounted on said spindle in transverse spaced relation and constrained for rotation therewith, said discs extending upwardly and adjacent to said aperture, said discs having a plurality of grooves disposed about the periphery thereof in complementary relation, each groove in one of said discs and the complementary groove in the other of said discs being positioned to receive supportingly one of said rods emerging through said aperture driving each revolution thereof, an agitator disposed in said hopper, said agitator being drivenly connected to said spindle and adapted to move said rods in said hopper into alinement with said aperture, a shoe connected to said hopper and positioned to retain said rods in said complementary grooves during a portion of each revolution of said discs, said discs being rotated in timed relation with said conveyor for depositing said rods on said magnets of said body elements on said conveyor transversely in predetermined longitudinally spaced relation contiguous to said wire frame, a guide element disposed on said base structure adjacent each side of said conveyor in complementary relation in second stage operating relation, said guide elements being positioned to shift said wire rods and said wire frame laterally into predetermined alinement with said conveyor, an electric welding mechanism disposed adjacent said conveyor in third stage operating relation, said mechanism consisting of a housing disposed adjacent said conveyor, a shaft disposed transversely and journaled to said housing in electrically insulated relation, a front electrode wheel and a rear electrode wheel constrained for rotation with said shaft, each of said electrode wheels having a plurality of electrodes positioned about the periphery thereof, said electrode wheels being transversely spaced for engagement with the portions of said rods contiguous with said wire frame, an electric contact means disposed on said base structure positioned to engage the longitudinal end portions of said wire frame adjacent said electrode wheels, a source of electric energy connected to said electrode wheels and said contact means and a second power transmission means drivingly connecting said shaft with said spindle in timed relation whereby said electrodes move into registry with said wire rods contiguous to said frame carried by said conveyor for welding said rods to said frame in sequence relation to form said grating.

9. For use in the manufacture of ferrous containing metal wire gratings and the like having a plurality of wire rods welded to a wire frame in transverse spaced relation, an automatic multi-stage assembling apparatus comprising in combination a stationary base structure, a longitudinally movable horizontal conveyor mounted operatively on said structure, a drive means mounted on said structure connected in driving relation to said conveyor, track means mounted on said base structure positioned to support the upper portion of said conveyor in substantially a horizontal plane, a plurality of body elements disposed in said conveyor, each of said body elements having a magnet disposed on the outer portion thereof, said body elements and magnets being positioned to receive engagingly said wire frame whereby said frame is carried by said conveyor, a wire rod dispenser disposed adjacent to the feeder end of said conveyor in first stage operating relation, said dispenser having a hopper adapted to support a plurality of said rods transversely above said conveyor, said hopper having a transverse aperture positioned in the lower portion thereof with sufficient clearance to permit emission of one of said rods therethrough at one time, a pair of transversely spaced depending brackets connected to said hopper, a transversely disposed spindle supported by said brackets in journaled relation, power transmission means in said apparatus connecting said spindle with said drive means for rotating said spindle in timed relation with said conveyor, a pair of discs mounted on said spindle in transverse spaced relation and constrained for rotation therewith, said discs extending upwardly and adjacent to said aperture, said discs having a plurality of grooves disposed about the periphery thereof in complementary relation, each groove in one of said discs and the complementary groove in the other of said discs being positioned to receive supportingly one of said rods emerging through said aperture during each revolution thereof, an agitator disposed in said hopper, said agitator being drivenly connected to said spindle and adapted to move said rods in said hopper into alinement with said aperture, a shoe connected to said hopper positioned to retain said rods in said complementary grooves during a portion of each revolution of said discs, said discs being rotated in timed relation with said conveyor for depositing said rods on said conveyor transversely in predetermined longitudinally spaced relation contiguous to said wire frame, a guide element disposed on said base structure adjacent each side of said conveyor in complementary relation in second stage operating relation, said guide elements being positioned to shift said rods and wire frame laterally into predetermined alinement with said conveyor, an electric welding mechanism disposed adjacent said conveyor in third stage operating relation, said mechanism consisting of a housing disposed adjacent said conveyor, a shaft disposed transversely and journaled to said housing in electrically insulated relation, a front electrode wheel and a rear electrode wheel constrained for rotation with said shaft, each of said electrode wheels having a plurality of electrodes positioned about the periphery thereof, said electrode wheels being transversely spaced for engagement with the portions of said rods contiguous with said wire frame, an electric contact means disposed on said base structure positioned to abut the longitudinal end portions of said wire frame adjacent said electrode wheels, a source of electric energy connected to said electrode wheels and said contact means, a second power transmission means drivingly connecting said shaft with said spindle in timed relation whereby said electrodes move into registry with said wire rods on said wire frame for welding said rods to said frame in sequence relation to form said grating, a chamfering device disposed adjacent said conveyor in fourth stage operating relation, said device consisting of a rotating front cutting element and a rotating rear cutting element, said cutting elements being positioned to engage in cutting relation the end portions of each of said rods of said grating in sequence as said conveyor moves said grating through said chamfering device thereby completing assembly of said wire grating, and means for discharging said wire grating from said apparatus at the terminal end of said conveyor.

10. For use in the manufacture of ferrous containing metal wire gratings and the like having a plurality of wire rods welded to a wire frame in transverse spaced relation, an automatic multi-stage assembling apparatus comprising in combination a stationary base structure, a movable conveyor mounted operatively on said base structure, said conveyor having an endless front chain, a drive shaft mounted on one end portion of said base structure, a first sprocket wheel connected to said drive shaft in driven relation, a first track member mounted longitudinally on said base structure, said track member being positioned to support slidably the upper portion of said chain in a substantially horizontal plane, said chain consisting of a plurality of front link members connected together in end-to-end relation, each of said link members having a body element adapted to engage slidably with said track member and cooperate with said sprocket wheel, a plate rigidly connected to the outer side of said body element, said plate extending downwardly for engagement with said track member and projecting upwardly of said body element, a plurality of upwardly opening lateral front slots disposed in said plate in longitudinal spaced relation, each of said slots being positioned for receiving one end portion of one of said wire rods, a magnet disposed in said body element in transverse alinement with each of said slots, a second track member disposed longitudinally on said base structure in parallel spaced relation with respect to said first track member, a second sprocket wheel connected to said drive shaft and positioned in alinement with said second track member, an endless rear chain slidably supported by said second track member in cooperative relation with said second sprocket wheel complementary to said front chain, said rear chain having rear slots and rear links respectively positioned in complementary relation with said front slots and front links of said front chain, each of said chains having a plurality of upwardly opening longitudinally spaced recesses in complementary relation, said recesses being positioned for receiving said wire frame in engaging relation, a wire rod dispenser disposed adjacent to the feeder end of said conveyor in first stage operating relation, said dispenser having a hopper adapted to support a plurality of said rods transversely above said conveyor, said hopper having a transverse aperture positioned in the lower portion thereof with sufficient clearance to permit emission of one of said rods therethrough at one time, a pair of transversely spaced depending brackets connected to said hopper, a transversely disposed spindle supported by said brackets in journaled relation, power transmission means in said apparatus connecting said spindle with said drive shaft for rotating said spindle in timed relation with said conveyor, a pair of discs mounted on said spindle in transverse spaced relation and constrained for rotation therewith, said discs extending upwardly and adjacent to said aperture, said discs having a plurality of grooves disposed about the periphery thereof in complementary relation, each groove in one of said discs and the complementary groove in the other of said discs being positioned to receive supportingly one of said rods emerging through said aperture driving each revolution thereof, a shoe connected to said hopper and extending along the periphery of said discs in radially spaced relation therewith to retain said wire rods in said complementary grooves driving a portion of each revolution of said discs, said discs being rotated in timed relation with said conveyor for registering said complementary grooves with a front slot and complementary rear slot of said conveyor for depositing said rod in said slots adjacent the longitudinal portions of said wire frame, an agitator disposed in said hopper, said agitator being drivenly connected to said spindle and adapted to move said rods in said hopper into alinement with said aperture whereby said dispenser progressively deposits a wire rod in each of said front slots and complementary rear slots of said conveyor, a guide element disposed on said base structure adjacent each of said chains in complementary position in second stage operating relation, said guide elements being positioned to shift said rods and the longitudinal portion of said wire frame into predetermined alinement with said chains, an electric welding mechanism disposed adjacent said conveyor in third stage operating relation, said mechanism consisting of a housing disposed adjacent said conveyor, a second shaft disposed transversely and journaled to said housing in electrically insulated relation, a front electrode wheel, an intermediate electrode wheel and a rear electrode wheel constrained for rotation with said second shaft, each of said electrode wheels having a plurality of electrodes positioned about the periphery thereof, said electrode wheels being transversely spaced for engagement of said electrodes with the end portion of said rods, an electric contact means disposed on said base structure positioned to engage the longitudinal end portions and intermediate portion of said wire frame adjacent said electrode wheels, a source of electric energy connected to said electrode wheels and said contact means, a second power transmission means drivingly connecting said second shaft with said spindle in timed relation whereby said electrodes move into register relation with said slots of said conveyor for welding said rods to said wire frame in sequence relation to form said grating, a chamfering device disposed adjacent said conveyor in fourth stage operating relation, said device consisting of a rotating front cutting element and a rotating rear cutting element, said cutting elements being positioned to engage in cutting relation the ends of each of said rods of said grating in sequence as said conveyor moves said grating through said chamfering device thereby completing assembly of said wire grating, and means for discharging said wire grating from said apparatus at the terminal end of said conveyor.

11. For use in depositing rods onto a receiving surface in timed sequence relation, a dispenser comprising in combination a hopper adapted to support a plurality of said rods in substantially horizontal direction, an elongated aperture positioned in the lower portion of said hopper, said aperture being of sufficient size to permit discharge in a substantially vertical direction one of said rods therethrough at a time, a rotatable spindle supported beneath said hopper in parallel spaced relation, power means connected to said spindle in drive relation for rotation thereof, a pair of discs mounted on said spindle and constrained for rotation therewith, said discs extending upwardly and adjacent to said aperture, said discs having a plurality of grooves disposed about the periphery thereof in complementary relation, each groove in one of said discs and the complementary groove in the other of said discs being positioned to receive supportingly one of said rods emerging through said aperture driving each revolution thereof, means connected to said hopper and extending adjacent the periphery of said discs in radially spaced relation to retain each said wire rod in said complementary grooves during a portion of each revolution of said discs, an agitator disposed in said hopper and having external drive means therefor, said agitator being adapted to move said rods in said hopper into alinement with said aperture whereby said dispenser deposits said rods singularly in timed sequence relation onto said receiving surface.

References Cited in the file of this patent

UNITED STATES PATENTS

| | | |
|---|---|---|
| 1,507,425 | Reed | Sept. 2, 1924 |
| 1,801,805 | Dobrick | Apr. 21, 1931 |
| 1,994,701 | Hall | Mar. 19, 1935 |
| 2,109,724 | Genebach | Mar. 1, 1938 |
| 2,390,174 | Roemer | Dec. 4, 1945 |